United States Patent
Zahoor (10) Patent No.: US 8,626,116 B2
(45) Date of Patent: Jan. 7, 2014

(54) REDUCING COMPUTATIONAL COMPLEXITY DURING USER DATA ANALYSIS

(75) Inventor: J Mohamed Zahoor, Chennai (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 75 days.

(21) Appl. No.: 13/505,012

(22) PCT Filed: Nov. 3, 2009

(86) PCT No.: PCT/SE2009/051240
§ 371 (c)(1), (2), (4) Date: Apr. 30, 2012

(87) PCT Pub. No.: WO2011/056099
PCT Pub. Date: May 12, 2011

(65) Prior Publication Data
US 2012/0214440 A1     Aug. 23, 2012

(51) Int. Cl.
*H04M 11/00* (2006.01)

(52) U.S. Cl.
USPC ............ 455/405; 455/422.1; 455/67.11

(58) Field of Classification Search
USPC ......... 455/405–409, 422.1–425, 67.11–67.16
See application file for complete search history.

(56) References Cited

U.S. PATENT DOCUMENTS

| | | | |
|---|---|---|---|
| 6,100,901 A * | 8/2000 | Mohda et al. ............ | 345/440 |
| 7,327,998 B2 * | 2/2008 | Kumar et al. ............ | 455/405 |
| 7,715,849 B2 * | 5/2010 | Spirito et al. ............ | 455/456.1 |
| 7,751,390 B2 * | 7/2010 | Mosko et al. ............ | 370/389 |
| 8,325,718 B2 * | 12/2012 | Liu et al. ............ | 370/389 |
| 8,532,648 B2 * | 9/2013 | Moritz et al. ............ | 455/422.1 |
| 2011/0319053 A1 * | 12/2011 | Jeong et al. ............ | 455/405 |
| 2013/0138663 A1 * | 5/2013 | Shivashankar et al. ....... | 707/748 |

FOREIGN PATENT DOCUMENTS

WO    WO 2008/140358 A1    11/2008

OTHER PUBLICATIONS

International Search Report, PCT Application No. PCT/SE2009/051240, Jul. 15, 2010, 3 pages.
Eschrich, S. et al.; "Fast accurate fuzzy clustering through data reduction," Fuzzy Systems, IEEE Transactions on, vol. 11, No. 2, pp. 262-270, Apr. 2003, doi: 10.1109/TFUZZ.2003.809902, URL: http://ieeexplore.ieee.org/stamp/stamp.jsp?tp=&arnumber=1192702&isnumber=26743; abstract.

* cited by examiner

*Primary Examiner* — Sharad Rampuria
(74) *Attorney, Agent, or Firm* — Myers Bigel Sibley & Sajovec, P.A.

(57) ABSTRACT

A method and apparatus for handling data related to users in a telecommunication network to support analysis of said users. Plural sets of parameter values relating to the users are read once, and a first level quantization cell is determined for each set of parameter values according to a default first level quantization scheme. Then, clusters of first level quantization cells populated by users are identified and an adaptive second level quantization scheme is formed by translating the identified clusters into second level quantization cells. Representative parameter values are also assigned to each second level quantization cell, wherein the representative parameter values are used for analyzing the users.

18 Claims, 5 Drawing Sheets

REDUCING COMPUTATIONAL COMPLEXITY DURING USER DATA ANALYSIS

CROSS-REFERENCE TO RELATED APPLICATION

This application is a 35 U.S.C. §371 national stage application of PCT International Application No. PCT/SE2009/051240, filed on Nov. 3, 2009, the disclosure and content of which is incorporated by reference herein as if set forth in its entirety. The above-referenced PCT International Application was published in the English language as International Publication No. WO 2011/056099 A1 on May 12, 2011.

TECHNICAL FIELD

The invention relates generally to a method and apparatus for supporting analysis of users in a communication network by handling and organising data related to said users.

BACKGROUND

In the field of telecommunication, solutions have been devised for enabling relevant and potentially attractive services that have been adapted to different service consumers according to their interests and needs in different situations. Some examples are directed advertising and personalised TV. There are also solutions for analysing users in a telecommunication network and identifying segments or "clusters" of users with common characteristics, such that services and marketing activities can be adapted to these user groups accordingly. This analysis work can be executed based on traffic data generated in communication networks.

Traffic data is generally available from Charging Data Records (CDR) generated and stored for the networks mainly to support the charging of users for executed calls and sessions. Traffic data can also be obtained by means of various traffic analysing devices, such as Deep Packet Inspection (DPI) units and other traffic detecting devices, which can be installed at various communication nodes in the network. The traffic data may refer to voice calls, SMS (Short Message Service), MMS (Multimedia Message Service), e-mails and game sessions, and to circuit-switched as well as packet-switched communication, in this description collectively referred to as "calls". The traffic data may also contain further information on the calls related to the time of day, call duration, location of users and type of service used. As a result, the user data that can be derived from such traffic data is often "multi-dimensional" in the sense of involving plural user-related parameters for each user.

For operators and service providers, it has thus become important to understand the consumers in order to provide adapted or "tailor made" services and products. It is therefore useful to identify certain segments of similar users based on their behavioural characteristics. Information on the users can be derived from the available traffic data which thus can be further analysed by using various techniques for so-called "data mining". For example, Machine Learning Algorithms (MLA:s) and tools can be used for processing the traffic data, which may be utilised by operators and service providers when developing and adapting services.

Figure 1:
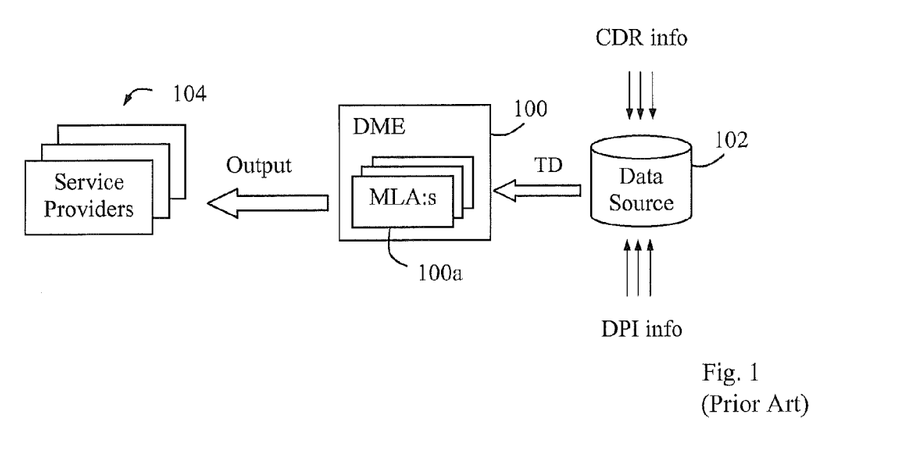
FIG. 1 is a schematic overview illustrating how data mining can be employed for a telecommunication network, according to the prior art.

A Data Mining Engine (DME) may further be employed that collects traffic data and extracts user information therefrom using various data mining and machine learning algorithms. FIG. 1 illustrates an example of how data mining can be employed for a communication network, according to the prior art. A DME 100 typically uses various MLA:s 100a for processing traffic data TD provided from a data source 102, and further to identify clusters of users. The data source 102 collects CDR information and DPI information from the network which is then provided as traffic data TD to the DME 100. After processing the traffic data, the DME 100 provides the resulting cluster information as output data to various service providers 104 to enable adapted services, products and marketing activities.

Analysing large quantities of traffic data and other information is typically a very complex and time-consuming process sometimes involving millions of calls, in order to identify different groups of similar users based on their previously executed communications. In the field of data mining, quantization of various parameter values is widely used to facilitate the analysis work and to reduce the computing and processing capacity required. Quantization means that a measured parameter value is approximated to a representative value in discrete steps of intervals.

Figure 2:
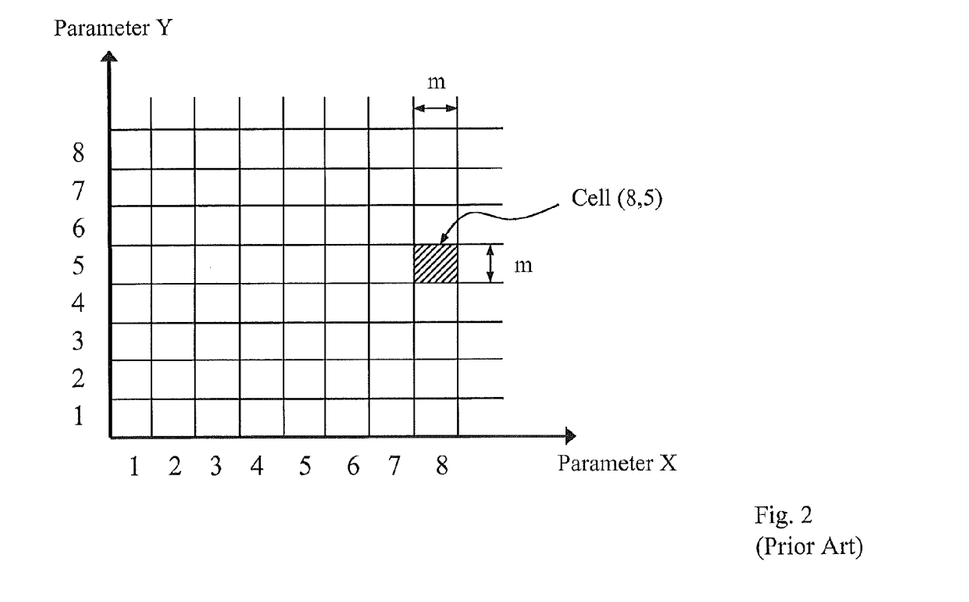
FIG. 2 is a schematic diagram of a basic quantization scheme with uniform cells in a two-dimensional parameter space, according to the prior art.

FIG. 2 is a schematic diagram illustrating how such quantization can be made in the case of two parameters X and Y of which values are obtained for a plurality of users in a communication network. For example, parameter X may be the costs in SEK (Swedish currency) for executed calls while parameter Y may be the duration in seconds of executed calls.

In this example, the quantization is made such that obtained parameter values within predefined ranges are approximated according to a numeric scale 1-8 of finite intervals for each parameter X and Y, thereby forming cells of equal size each covering a pair of intervals of the scales. Each cell is assigned an identity which is representative for any pair of measured parameter values falling within the ranges defined by the cell. The cell identity may be any type of code and each cell covers values within a predefined interval "m" for each parameter. Although this particular example refers to cells in a two-dimensional quantization scheme or "parameter space", it can be readily understood that this kind of cell representation is also applicable for any other multi-dimensional quantization schemes. Basically, this cell model implies that cells in a quantized parameter space are of equal length in all the dimensions although the actual parameters may well be measured in different entities, such as SEK and seconds, respectively.

In this example, a cell is marked that has been given an identity of (8,5) which explicitly indicates the representative value ranges of 8 and 5 for parameters X and Y, respectively. Hence, the quantization is made such that any pair of measured X and Y values that falls within that cell is represented by the cell identity of (8,5). This will simplify the following computation made based on the representative cell identity, as compared to using the original values which are typically more detailed and precise, e.g. 1234 SEK and 56789 seconds, and therefore more complex to compute.

Figure 3:
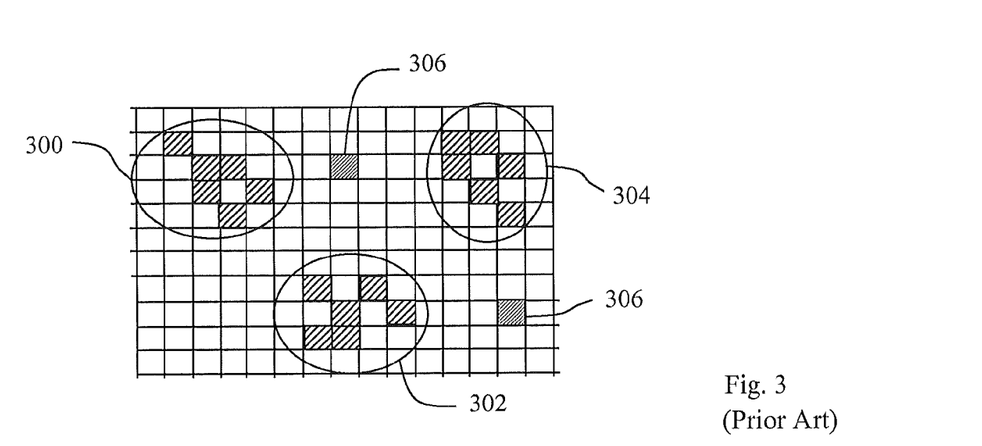
FIG. 3 is a schematic diagram of a two-dimensional quantization scheme in which three clusters are identified, according to the prior art.

When cells have been defined for a parameter space in the above manner, each pair of obtained parameter values is represented by a cell identity, which is done by reading or "scanning" input data related to multiple users in the communication network. FIG. 3 illustrates an example of how different cells are populated with users falling within their respective cells, as marked in the cell diagram. In this case, three different clusters 300, 302 and 304 of populated cells can be discerned in the diagram, while some "stray" cells 306 have also been populated with users that cannot be considered to fall within any discerned cluster, which are therefore disregarded.

Quantization is thus used in clustering, to achieve short processing time which is typically dependent merely on the number of cells in each dimension in the quantized space. Some clustering algorithms known as "WaveCluster", "WaveCluster+" and "STING" use quantization in preparation to determine clusters in data. However, it is a problem with the quantization model described above, that a uniform size or granularity of cells must be selected in a trade-off between the accuracy, or "quality", of the clusters and the computational complexity, i.e. the finer cell granularity and higher accuracy/quality, the greater complexity, and vice versa.

Figure 4:
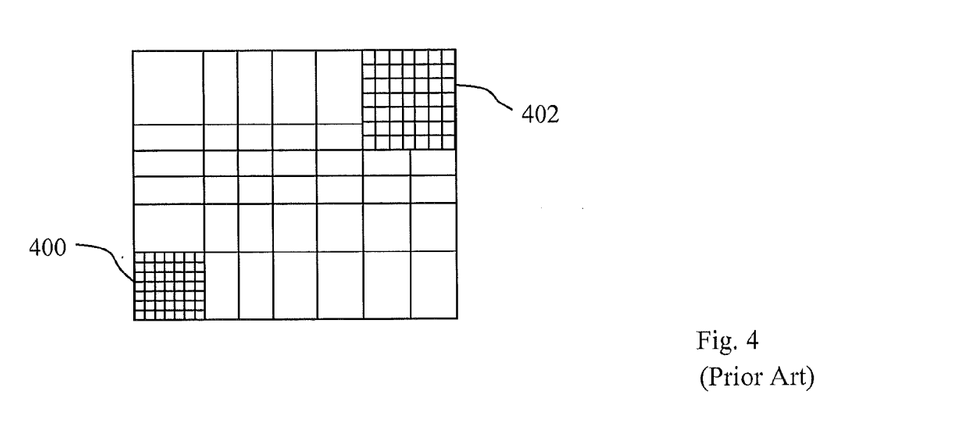
FIG. 4 is a schematic diagram of a two-dimensional adaptive quantization scheme, according to the prior art.

This has been addressed in the field of data mining by using adaptive quantization, i.e. varying the cell size depending on the distribution of input data and/or accuracy needed. Adaptive quantization techniques tend to use a small cell size in areas of the multi-dimensional parameter space with relatively dense data distribution, while a larger cell size is used in areas with more sparse data distribution, which is illustrated by an adaptive quantization scheme shown in FIG. 4. Two areas 400 and 402 with dense data distribution are thus given a fine cell granularity, while other areas with more sparse data distribution are given a "coarser" cell granularity.

Hence, adaptive quantization can provide good accuracy or quality in areas where it is really needed while lesser accuracy can be tolerated in other areas. However, in adaptive quantization, the input data must be read or scanned at least twice according to prior solutions: firstly to find out which areas in the multi-dimensional parameter space are densely populated for defining the adaptive cell sizes in different areas, and then secondly to quantize the input data according to the adaptive cell definitions. It can be readily understood that reading the typically large amounts of input data more than once can be very time-consuming, also requiring great processing capacity. Moreover, reading the data twice requires that all data has been received, resulting in substantial delays.

SUMMARY

It is an object of the invention to generally address the issues outlined above. It is thus an object to support analysis of users in a communication network with relevant accuracy and quality where needed or desired, while the computational complexity for processing user data can be kept at a reasonable (i.e. relatively low) level. These objects and others may be achieved primarily by a solution according to the appended independent claims.

According to different aspects, a method and an apparatus are defined for handling data related to users in a telecommunication network to support analysis of said users. In the method, plural sets of parameter values obtained from traffic data of the users are read, where each parameter value set is valid for a particular user and comprises values of two or more measured user-related parameters. A first level quantization cell is also determined for each read set of parameter values according to a default first level quantization scheme. In this way, the first level quantization cells are effectively "populated" with users.

Eventually, clusters of neighbouring first level quantization cells, which are populated by users, will emerge and can thus be identified, e.g. according to a predefined clustering condition. An adaptive second level quantization scheme is further formed by translating the identified clusters into new second level quantization cells. The users populating a new second level cell can thus be regarded as being similar by having basically the same characteristics with respect to the measured parameters. Representative parameter values are then also assigned to each second level quantization cell. The representative parameter values can be used for analysing the users, e.g. in the purpose of marketing activities and/or for adapting services and products.

The apparatus involves a data handling unit configured to handle data basically according to the method above. The data handling unit comprises a parameter reading unit adapted to read sets of parameter values obtained from traffic data of said users, where each parameter value set is valid for a particular user and comprises values of two or more user-related parameters. The data handling unit further comprises a cell populating unit adapted to populate first level quantization cells with users according to a default first level quantization scheme by determining a first level quantization cell for each read set of parameter values. The data handling unit further comprises a cluster identifying unit adapted to identify clusters of first level quantization cells populated by users, and a quantization unit adapted to form an adaptive second level quantization scheme by translating the identified clusters into second level quantization cells and assigning representative parameter values to each second level quantization cell.

The invented method and apparatus may be implemented according to any of the following optional embodiments.

In one embodiment, the first level quantization cells with populating users are stored in a first data storage, and the formation of second level quantization cells with assigned representative parameter values are stored in a second data storage. The work of reading parameter values, determining first level quantization cells, and identifying clusters, can also be distributed over plural processing entities operating in parallel, e.g. based on the users' MSISDN (Mobile Station International ISDN Number) number series or on the current load distribution in said processing entities.

In further possible embodiments, clusters are identified according to a predefined clustering condition dictating when a user-populated first level quantization cell belongs to a cluster. The predefined clustering condition may dictate that a user-populated cell belongs to a cluster when bordering at least one user-populated neighbour cell. A counter of a first level quantization cell may also be incremented whenever that cell is populated by a user, and the predefined clustering condition could further dictate that a user-populated first level quantization cell belongs to a cluster when the number of users populating the cell reaches a preset population threshold.

The action of identifying the clusters above may be triggered by any of: a preset timeout period has expired, a preset amount of parameter value sets have been read, and a preset amount of first level quantization cells have been populated with users. Furthermore, different types of parameter values may be assigned to each second level quantization cell, such as a set of parameter mean values and/or one or more sets of parameter boundary values defining the outer limits of parameter values covered by the corresponding identified cluster. The number of assigned parameter values can be freely selected depending on which level of accuracy is needed or desired for defining the second level cells.

Further possible features and benefits of the invention will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

Briefly described, a solution is provided for obtaining relevant clustering accuracy and quality in areas of a multi-dimensional parameter space where needed or desired, while it is sufficient to read or scan the input data related to multiple users in a communication network just once. In this solution, quantization is made in two phases involving a predefined, or default, fixed first level quantization scheme which is a relatively fine mesh with small fixed cells, and an adaptive cluster-based second level quantization scheme which is basically a more coarse mesh with larger cells, respectively.

In the first quantization phase, available user-related parameter values measured from traffic data are read and quantized according to the default first level quantization scheme, effectively populating the cells with users. As the first level quantization cells are populated by users according to their parameter values, clusters of such populated cells can be identified, e.g. based on a predefined clustering condition dictating when a cell is considered to belong to a cluster. In this process, it may be of interest to register some suitable identification of the users populating the cells to know which cluster and/or first level cell each user belongs to, or just to register the number of users in each cell to know generally which clusters exist in the network.

As the first level quantization scheme is relatively fine, i.e. having small cells, the identified clusters may have any size or shape. It may also happen that some neighbouring clusters overlap each other by one or more first level cells and such overlapping clusters are then considered to jointly form the same cluster.

In the second quantization phase, the adaptive second level quantization scheme is formed based on the clusters identified from the first quantization phase, such that each identified cluster forms a second level quantization cell with the size and shape of that cluster. Each cell is also given an identity comprising a set of representative parameter values which are to be valid for all users populating that cell. The second level quantization is thus adaptive since the second level quantization cells will have different sizes and shapes according to the identified clusters, each cell being representative for a segment of users with similar or common characteristics. The representative parameter values may include mean values of the cluster and/or values defining the shape and size of the cell, such as its outer boundaries or the like.

The representative parameter values of the second level quantization cells are then used for analysing the users, e.g. with the purpose of adapting services, products and marketing activities, which can be useful for various service providers and network operators. As a result, the computational complexity is kept at a reasonably low level by this quantization while the second level cells clearly indicate segments of users. In this process, the users' parameter values may be input to various MLA:s or the like, e.g. in a DME, in order to compute different information therefrom.

A representative parameter of a cluster or second level cell can thus be used to identify the characteristics of the users in that cluster/cell. One example is to give these parameters to a supervised learning algorithm which has already learned the characteristics of users having left the network, to identify whether an identified cluster of users exhibit a certain behaviour.

A simplified example of how a two-dimensional adaptive quantization scheme can be formed when using the solution above, will now be described with reference to the schematic diagram of FIG. 5. Although this example refers to two-dimensional schemes involving only two user-related parameters X and Y for simplicity, it should be understood that this solution can be applied in the described manner for any number of user-related parameters and any corresponding multi-dimensional quantization schemes. The parameters X and Y may be any measurable user-related parameters that can be obtained from traffic data, as explained above.

Figure 5:
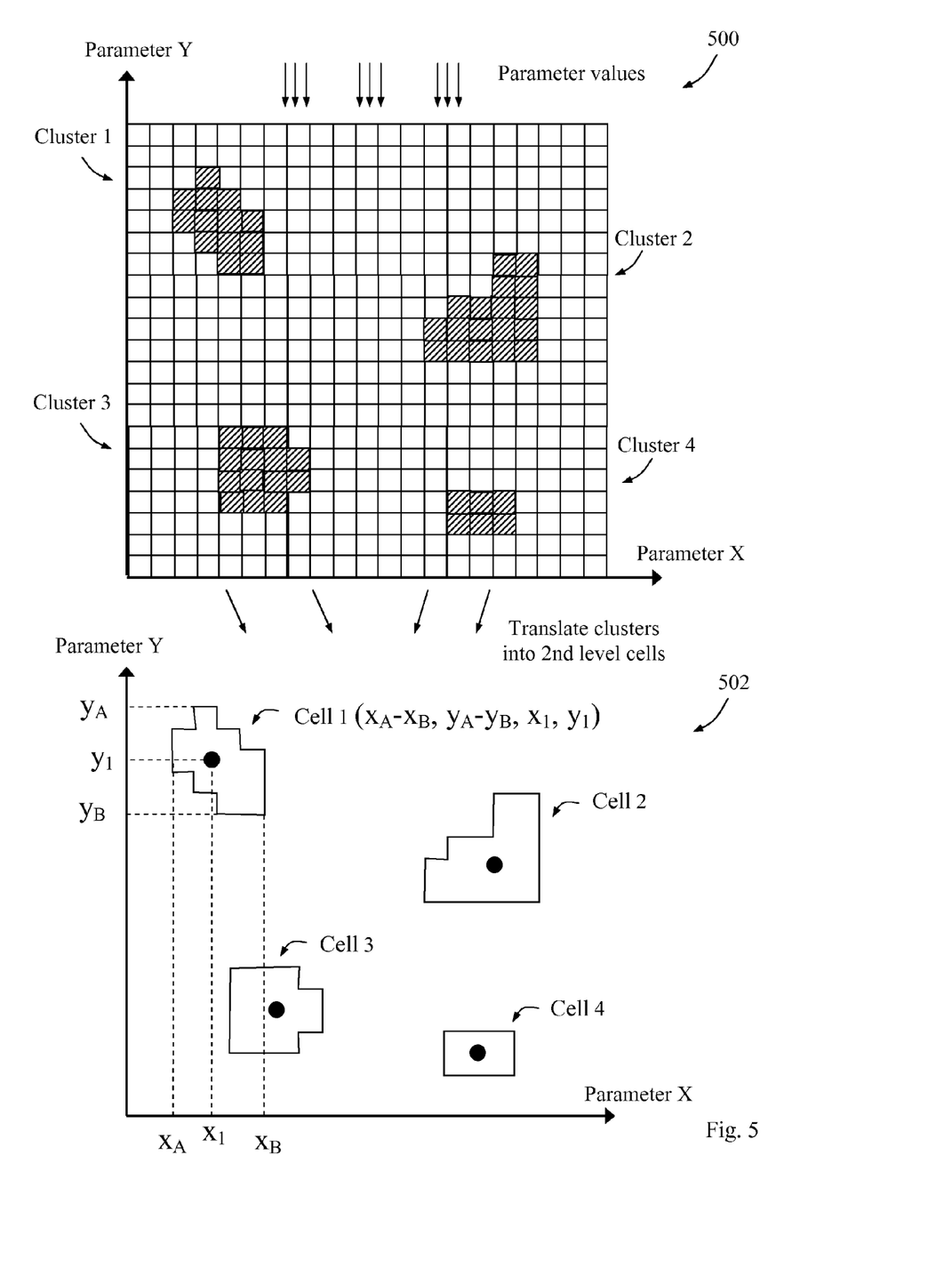
FIG. 5 is a schematic diagram illustrating an example of how a two-dimensional adaptive quantization scheme can be formed, according to one possible embodiment.

The process of quantization in two phases is illustrated from top to bottom in FIG. 5. Thus, measured and initially non-quantized parameter values relating to a plurality of users are first read and then quantized in the first quantization phase according to a default first level quantization scheme 500 having a fixed cell size forming a relatively fine mesh in an X-Y diagram, as shown in the upper half of the figure. When the parameter values are quantized in this way, they will appear or "land" in different cells such that the corresponding users then effectively "populate" the cells, according to the terminology used here. In one possible and relatively simple embodiment, a counter can be maintained for each first level quantization cell, which is incremented whenever that cell is populated by a user in this process. Another possibility is to maintain a list of populating users for each cell. The list will thus record a suitable identification of the user who has appeared in that cell.

As the first level quantization cells are populated by users according to their parameter values, it is eventually possible to discern clusters of adjacent cells which are sufficiently populated with users. The clusters may be identified according to a predefined clustering condition dictating when a user-populated first level quantization cell is considered to belong to a cluster. For example, the predefined clustering condition may dictate that a user-populated cell belongs to a cluster when bordering at least one other user-populated neighbour cell. The predefined clustering condition may further dictate that a user-populated first level quantization cell belongs to a cluster when the number of users populating the cell reaches a preset population threshold, which can be detected by means of the above-mentioned counters.

In the figure, the user-populated cells are marked with crossed lines and in this example, four clusters 1-4 can be identified having various sizes and shapes, e.g. according to a predefined clustering condition as described above. Any stray cells populated with users but not falling within any discerned cluster, e.g. by not fulfilling the predefined clustering condition, have been disregarded and are not shown in this example, even though such cells may of course frequently occur.

In the second phase of quantization, the above-identified clusters 1-4 are translated, or converted, into new second-level cells 1-4 encompassing sizes and shapes of the corresponding clusters, thereby forming an adaptive second level quantization scheme 502. Each formed second-level cell is thus populated by the users populating the original first level cells in the corresponding cluster. The new cells 1-4 of the adaptive second level quantization scheme 502 are shown in the lower half of the figure.

Furthermore, representative parameter values are assigned to each second level cell. For example, at least a pair of representative parameter mean values (X,Y) can be assigned to each second level cell. Each cell may also be defined by its boundaries, i.e. the outer limits of X-values and Y-values, respectively, covered by the cluster. In that case, two further pairs of representative parameter boundary values X, Y are also assigned to each second level cell. The second level cell may also be assigned the latter boundary values only, thus omitting the above parameter mean values.

In this example, cell 1 is assigned the parameter boundary values of $(X_A-X_B)$ and $(Y_A-Y_B)$, respectively, as well as the parameter mean values of $(X_1,Y_1)$. Cells 2-4 can be assigned corresponding parameter boundary and mean values, not shown. In this operation, the parameter mean values (X,Y) should preferably be selected for a second level cell to be as representative as possible for the users in the cluster/cell, thus basically "in the middle" of the second level cell, as shown in the figure.

These representative parameter values may be considered as valid for all users populating the corresponding cell, the users therein effectively being identified as a segment of users with common or similar characteristics, at least with respect to the parameters X, Y, and can be used for analysing the users, as described above. It should be noted that the resulting second level cells may have any size and shape, while the first level cells of the default quantization scheme have regular and uniform shape and are non-overlapping. It should also be noted that the above simplified example of using a single pair of boundary values per parameter or dimension for defining the second level cells, the resulting shape of those cells will be relatively simple. However, when a more accurate second level cell should be formed from a cluster encompassing a complex shape, further parameter boundary values may be needed to properly define that cell.

Hence, this solution can provide reduced computational complexity when using the representative parameter values for users according to the actual clusters formed, while maintaining relevant accuracy and quality. It is a further advantage that it is only necessary to scan or read the typically large amounts of input data once, i.e. initially for carrying out the first quantization phase. Thereby, the quantization process can start as soon as the first input data is received without having to wait for all the data to arrive for processing.

The above process of quantizing in two phases can thus be performed on a continuous basis, i.e. as soon as non-quantized parameter values become available. The clusters may then be modified dynamically such that the size and shape of the second level cells in the adaptive second level quantization scheme will change accordingly. For example, if a new cluster emerging in the first level quantization overlaps with an already existing cell in the second level quantization, the newly identified cluster is "merged" with the existing cell in the second level quantization to form a new expanded second level cell.

A preset time-out period may also be employed for cell-populating users such that a user populating a particular first level cell is deleted from that cell when the time-out period expires, thereby decreasing the counter of that cell. In effect, the reason for that user populating the cell has become outdated and is no longer valid, particularly when the measured parameters are of dynamic nature. In that case, certain first level cells may eventually be excluded from the cluster, e.g. when not fulfilling a used clustering condition any more, thereby possibly reducing the size and shape of the corresponding second level cell.

In a possible implementation, the first level quantization cells with populating users can be stored in a first data storage such as a cache, and the second level quantization cells with assigned representative parameter values and populating users can be stored in a second data storage such as a cache, thereby making the data readily available for processing. Furthermore, the work of processing input data and determining first level quantization cells may be distributed over plural processing entities operating in parallel, which will be described further below. In that case, the work distribution may be based on the users' MSISDN (Mobile Station International ISDN Number) number series or similar terminal or user identity, or on the current distribution of processing and/or storing load in the processing entities.

The operation of identifying clusters of first level quantization cells may be triggered by any of: a preset timeout period has expired, a preset amount of parameter value sets have been read, and a preset amount of first level quantization cells have been populated with users. As said above, the collection of parameter values and population of first level cells may go on more or less continuously, while clusters may be identified or modified at any time, e.g. triggered as above.

Figure 6:
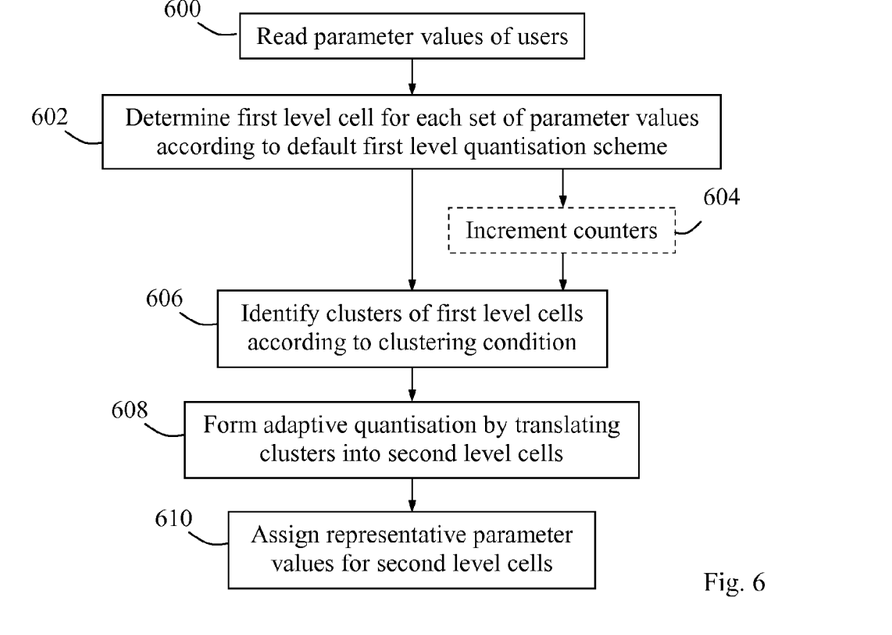
FIG. 6 is a flow chart illustrating a procedure for handling and organising data related to users in a communication network to support analysis of said users, according to another possible embodiment.

A procedure for handling and organising data related to users in a communication network, will now be described with reference to the flow chart of FIG. 6. The steps in this procedure can be performed by a data handling unit, e.g. implemented in a DME or other entity for extracting user information, which may be controlled by an operator of the network or by a third party. It is assumed that multiple sets of parameter values can be obtained for the users from their traffic data available from the network, although this process as such lies somewhat outside the scope of this solution. Further, each set of parameter values is valid for a particular user and thus comprises values of two or more user-related parameters.

In a first shown step 600, the above sets of parameter values, obtained from traffic data of the users, are read or scanned, e.g. on a more or less continuous basis as data become available. In this step, the amount of data to be read may be huge for a fairly extensive network. It is thus an advantage of this solution that this information is read just once.

A first level quantization cell is also determined for each received set of parameter values according to a default first level quantization scheme, in a step 602, such as the first level scheme 500 in FIG. 5. Thereby, cells in a mesh of the first level quantization scheme are gradually populated with users. In practice, steps 600 and 602 can basically be executed in parallel such that whenever a set of parameter values of a user is read, a first level cell is determined into which the read values falls, thereby populating that cell. A counter for the cell may also be incremented, as described above, which is shown by an optional step 604. The first level quantization cells with populating users may also be stored in a first data storage.

At some point, clusters of the first level cells are identified, e.g. according to a predefined clustering condition, in a next step 606. The cluster identification may be triggered by different factors as described above, e.g. when a preset timeout period has expired, a preset amount of parameter value sets have been read, or when a preset amount of first level quantization cells have been populated with users. However, the invention is generally not limited to any particular identification triggering mechanism.

In a following step 608, an adaptive second level quantization scheme is formed by translating the above-identified clusters into second level quantization cells, such as the quantization scheme 502 in FIG. 5. Also, representative parameter values are assigned to each second level quantization cell, effectively as a cell identity, in a further step 610. Thereby, the representative parameter values can be used for analysing the users, e.g. using various MLE:s or similar, which is a process lying outside the scope of this solution.

The above procedure will thus provide user information in the form of data that can be computed and processed without undue complexity and/or delays since, firstly, the input data is read just once and, secondly, the adaptive second level quantization is closely related to different segments of users with common or similar characteristics.

Figure 7:
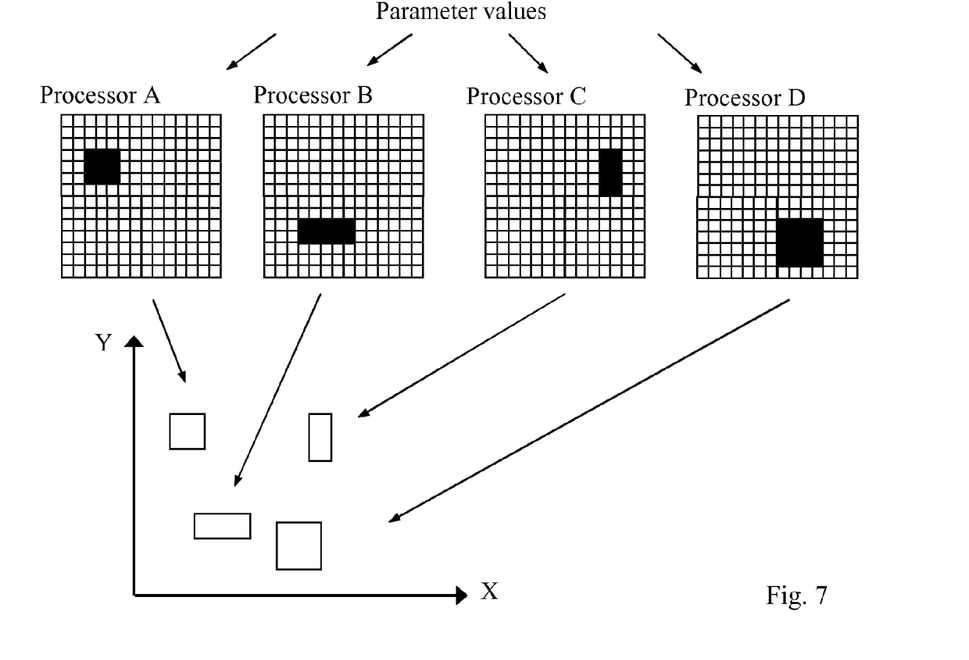
FIG. 7 is a schematic diagram illustrating another example of using parallel processor entities when forming a two-dimensional adaptive quantization scheme, according to yet another possible embodiment.

As indicated above, the work of reading parameter values, determining first level quantization cells, and identifying clusters, may be distributed over plural processing entities operating in parallel, which could make this process even less time-consuming. An example of using parallel processor entities when forming a two-dimensional adaptive quantization scheme, is illustrated by the diagram of FIG. 7. In this example, initially non-quantized user-related parameter values are read and quantized in the first quantization phase according to one or more default first level quantization schemes by means of four processing entities A-D operating in parallel. The figure shows that each processor A-D receives and processes a part of all available sets of parameter values, e.g. roughly 25% each if a uniform distribution is employed.

The distribution of input data and processing work over the processors may otherwise be selected based on various factors, e.g., different ranges of the users' MSISDN number series or the current load and/or available capacity of the processors. However, any other distribution mechanism or condition may be employed and the invention is not limited in this respect.

At some point, processors A-D may eventually identify one or more clusters of first level cells, e.g. according to a clustering condition, and each identified cluster is then translated into a second level cell of a single common mesh structure of second level cells. The second level cells thus form an adaptive second level quantization scheme, as illustrated in the lower half of the figure. In the shown example, the processors A-D have identified one cluster each, in this case with rectangular shapes for simplicity, although two or more processors may well identify one or more clusters that basically coincide, either completely or partly.

Figure 8:
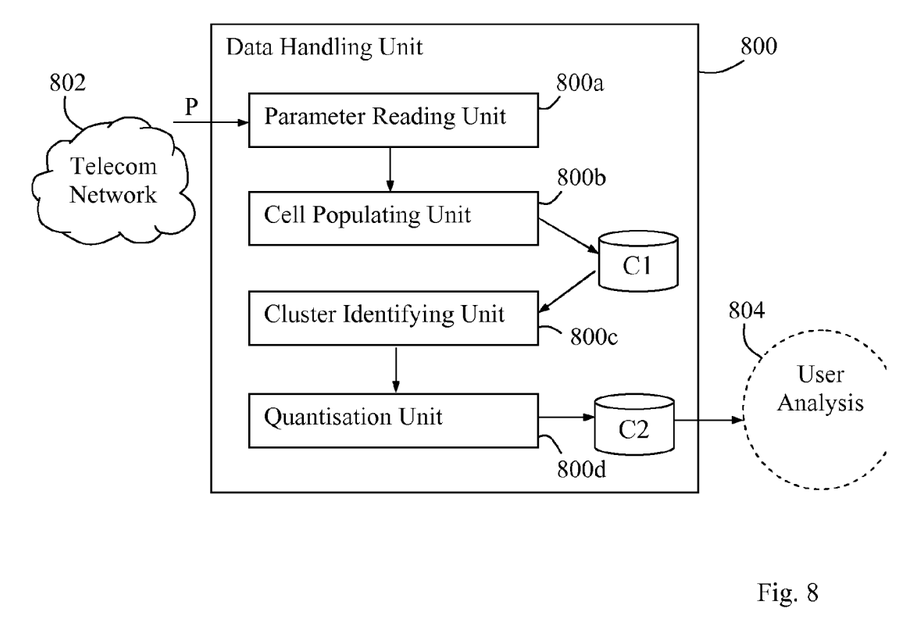
FIG. 8 is a schematic block diagram illustrating an apparatus for data handling in more detail, according to further possible embodiments.

An apparatus for data handling will now be described in more detail with reference to the block diagram of FIG. 8 illustrating a data handling unit 800 configured to handle data related to users in a telecommunication network 802 to support analysis of said users. The data handling unit 800 may be used to accomplish any of the above-described procedures and embodiments.

The data handling unit 800 comprises a parameter reading unit 800a adapted to read sets of parameter values P obtained from traffic data of the users, each parameter value set being valid for a particular user and comprising values of two or more user-related parameters. Unit 800 further comprises a cell populating unit 800b adapted to populate first level quantization cells with users according to a default first level quantization scheme by determining a first level quantization cell for each received set of parameter values.

Unit 800 further comprises a cluster identifying unit 800c adapted to identify clusters of first level quantization cells populated by users, and a quantization unit 800d adapted to form an adaptive second level quantization scheme by translating the identified clusters into second level quantization cells. The cluster identifying unit 800c also assigns representative parameter values to each second level quantization cell. The representative parameter values can then be used for analysing the users, e.g. in a user analysing functionality 804 or similar, the details of which are somewhat outside the scope of this solution.

The data handling unit 800 may further comprise a first data storage or cache C1 adapted to store information on the first level quantization cells with populating users, which is provided from the cell populating unit 800b, e.g. on a more or less continuous manner as soon as the measured parameter values become available from the network 802. Unit 800 may also comprise a second data storage or cache C2 adapted to store the formation of second level quantization cells with assigned representative parameter values, as provided from the quantization unit 800d.

In practice, the operational functions in the parameter reading unit 800a, the cell populating unit 800b and the cluster identifying unit 800c for reading parameter values, determining first level quantization cells, and identifying clusters, respectively, may be distributed over plural processing entities operating in parallel, e.g. as shown in the example of FIG. 7.

The data handling unit 800 may be configured according to further embodiments. For example, the cluster identifying unit 800c may be further adapted to identify said clusters according to a predefined clustering condition dictating when a user-populated first level quantization cell belongs to a cluster.

Further, the cell populating unit 800b may be further adapted to increment a counter of a first level quantization cell whenever that cell is populated by a user, in the manner described above. In another embodiment, the cluster identifying unit 800c is further adapted to identify clusters of first level quantization cells when triggered by any of: a preset timeout period has expired, a preset amount of parameter value sets have been read, and a preset amount of first level quantization cells have been populated with users.

The quantization unit 800d may be further adapted to assign one or more of the following parameter values to each second level quantization cell: a set of parameter mean values, and one or more sets of parameter boundary values defining the outer limits of parameter values covered by the corresponding identified cluster.

It should be noted that FIG. 8 merely illustrates various functional units in the data handling unit 800 in a logical sense, although the skilled person is free to implement these functions in practice using any suitable software and hardware means. Thus, the invention is generally not limited to the shown structure of the data handling unit 800 while its functional units 800a-d may be configured to operate according to the methods and procedures described above for FIGS. 5-7, where appropriate. Further, the data handling unit 800 could alternatively be called a system, apparatus, arrangement or entity for data handling.

By employing the invention according to any of the above-described aspects and embodiments, data relating to users in the network can be computed and processed with reduced complexity and/or delays by achieving a useful quantization.

Thereby, less processing and storing capacity will be generally required. It is thus an advantage that it is sufficient to read the input data just once and that the adaptive second level quantization is closely related to different segments of users with common or similar characteristics.

This solution is also flexible in the sense that the quality or accuracy of the second level quantization can be freely selected by assigning a suitable number of representative parameter values, such as the above parameter boundary values, to define each second level cell with more or less accuracy. The described process can also be used in a continuous manner, allowing for clusters and second level cells to be formed, modified and merged more or less dynamically as new data becomes available from the network.

While the invention has been described with reference to specific exemplary embodiments, the description is generally only intended to illustrate the inventive concept and should not be taken as limiting the scope of the invention. The invention is defined by the appended claims.

The invention claimed is:

1. A method of handling data related to users in a telecommunication network to support analysis of said users, the method comprising the following steps:
   reading sets of parameter values obtained from traffic data of said users, each parameter value set being valid for a particular user and comprising values of two or more user-related parameters;
   determining a first level quantization cell for each read set of parameter values according to a default first level quantization scheme, thereby populating first level quantization cells with users;
   identifying clusters of first level quantization cells populated by users;
   forming an adaptive second level quantization scheme by translating the identified clusters into second level quantization cells; and
   assigning representative parameter values to each second level quantization cell, wherein the representative parameter values are used for analysing the users,
   wherein one or more of the following parameter values are assigned to each second level quantization cell: a set of parameter mean values (X,Y) and one or more sets of parameter boundary values $(X_A-X_B, Y_A-Y_B, \ldots)$ defining the outer limits of parameter values covered by the corresponding identified cluster.

2. A method according to claim 1, wherein said first level quantization cells with populated users are stored in a first data storage, and said formation of second level quantization cells with assigned representative parameter values are stored in a second data storage.

3. A method according to claim 1, wherein the method of reading parameter values, determining first level quantization cells, and identifying clusters, is distributed over plural processing entities operating in parallel.

4. A method according to claim 3, wherein the distribution of the method over the plural processing entities operating in parallel is determined in response to the users' MSISDN number series.

5. A method according to claim 3, wherein the distribution of the method over the plural processing entities operating in parallel is determined in response to the current load distribution in said processing entities.

6. A method according to claim 1, wherein said clusters are identified according to a predefined clustering condition dictating when a user-populated first level quantization cell belongs to a cluster.

7. A method according to claim 6, wherein the predefined clustering condition dictates that a user-populated cell belongs to a cluster when bordering at least one user-populated neighbour cell.

8. A method according to claim 7, wherein a counter of a first level quantization cell is incremented whenever that cell is populated by a user, and the predefined clustering condition further dictates that a user-populated first level quantization cell belongs to a cluster when the number of users populating the cell reaches a preset population threshold.

9. A method according to claim 1, wherein the step of identifying clusters of first level quantization cells is triggered by at least one of: a preset timeout period has expired, a preset amount of parameter value sets have been read, and a preset amount of first level quantization cells have been populated with users.

10. A data handling unit configured to handle data related to users in a telecommunication network to support analysis of said users, the data handling unit comprising:
    a parameter reading unit adapted to read sets of parameter values (P) obtained from traffic data of said users, each parameter value set being valid for a particular user and comprising values of two or more user-related parameters;
    a cell populating unit adapted to populate first level quantization cells with users according to a default first level quantization scheme by determining a first level quantization cell for each read set of parameter values;
    a cluster identifying unit adapted to identify clusters of first level quantization cells populated by users; and
    a quantization unit adapted to form an adaptive second level quantization scheme by translating the identified clusters into second level quantization cells and assigning representative parameter values to each second level quantization cell, wherein the representative parameter values are used for analysing the users,
    wherein the quantization unit is further adapted to assign one or more of the following parameter values to each second level quantization cell: a set of parameter mean values (X,Y), and one or more sets of parameter boundary values $(X_A-X_B, Y_A-Y_B, \ldots)$ defining the outer limits of parameter values covered by the corresponding identified cluster.

11. A data handling unit according to claim 10, further comprising a first data storage adapted to store said first level quantization cells with populated users, and a second data storage adapted to store the formation of second level quantization cells with assigned representative parameter values.

12. A data handling unit according to claim 10, wherein the operational functions in the parameter reading unit, the cell populating unit and the cluster identifying unit for reading parameter values, determining first level quantization cells, and identifying clusters, respectively, is distributed over plural processing entities operating in parallel.

13. A data handling unit according to claim 12, wherein distribution of the operational functional is determined in response to the users' MSISDN number series.

14. A data handling unit according to claim 12, wherein distribution of the operational functional is determined in response to the current load distribution in said processing entities.

15. A data handling unit according to claim 10, wherein the cluster identifying unit is further adapted to identify said clusters according to a predefined clustering condition dictating when a user-populated first level quantization cell belongs to a cluster.

16. A data handling unit according to claim 15, wherein the predefined clustering condition dictates that a user-populated cell belongs to a cluster when bordering at least one user-populated neighbour cell.

17. A data handling unit according to claim 16, wherein the cell populating unit is further adapted to increment a counter of a first level quantization cell whenever that cell is populated by a user, and the predefined clustering condition further dictates that a user-populated first level quantization cell belongs to a cluster when the number of users populating the cell reaches a preset population threshold.

18. A data handling unit according to claim 10, wherein the cluster identifying unit is further adapted to identify clusters of first level quantization cells when triggered by at least one of: a preset timeout period has expired, a preset amount of parameter value sets have been read, and a preset amount of first level quantization cells have been populated with users.

* * * * *